United States Patent
Niu et al.

(10) Patent No.: US 11,928,586 B2
(45) Date of Patent: Mar. 12, 2024

(54) QUANTUM COMPUTATION THROUGH REINFORCEMENT LEARNING

(71) Applicant: Google LLC, Mountain View, CA (US)

(72) Inventors: Yuezhen Niu, El Segundo, CA (US); Hartmut Neven, Malibu, CA (US); Vadim Smelyanskiy, Mountain View, CA (US); Sergio Boixo Castrillo, Rancho Palos Verdes, CA (US)

(73) Assignee: Google LLC, Mountain View, CA (US)

( * ) Notice: Subject to any disclaimer, the term of this patent is extended or adjusted under 35 U.S.C. 154(b) by 780 days.

(21) Appl. No.: 16/962,059

(22) PCT Filed: Jan. 31, 2018

(86) PCT No.: PCT/US2018/016238
§ 371 (c)(1),
(2) Date: Jul. 14, 2020

(87) PCT Pub. No.: WO2019/152020
PCT Pub. Date: Aug. 8, 2019

(65) Prior Publication Data
US 2020/0410343 A1    Dec. 31, 2020

(51) Int. Cl.
*G06N 3/08* (2023.01)
*G06N 10/00* (2022.01)

(52) U.S. Cl.
CPC .............. *G06N 3/08* (2013.01); *G06N 10/00* (2019.01)

(58) Field of Classification Search
CPC .................................. G06N 3/08; G06N 10/00
See application file for complete search history.

(56) References Cited

U.S. PATENT DOCUMENTS

| | | |
|---|---|---|
| 2015/0317558 A1 | 11/2015 | Adachi et al. |
| 2017/0351967 A1 | 12/2017 | Babbush et al. |
| 2017/0357539 A1 | 12/2017 | Dadashikelayeh et al. |

FOREIGN PATENT DOCUMENTS

| | | |
|---|---|---|
| JP | 2019-520645 | 7/2019 |
| JP | 2021-512395 | 5/2021 |
| WO | WO 2019152020 | 8/2019 |

OTHER PUBLICATIONS

AU Office Action in Australian Application No. 2018406532, dated Feb. 3, 2021, 3 pages.
JP Office Action in Japanese Appln. No. 2021-183504, dated Nov. 28, 2022, 4 pages (with English Translation).
Office Action in Australian Appln. No. 2021203130, dated Feb. 23, 2022, 3 pages.

(Continued)

*Primary Examiner* — Markus A. Vasquez
(74) *Attorney, Agent, or Firm* — Fish & Richardson P.C.

(57) ABSTRACT

Methods, systems, and apparatus for designing a quantum control trajectory for implementing a quantum gate using quantum hardware. In one aspect, a method includes the actions of representing the quantum gate as a sequence of control actions and applying a reinforcement learning model to iteratively adjust each control action in the sequence of control actions to determine a quantum control trajectory that implements the quantum gate and reduces leakage, infidelity and total runtime of the quantum gate to improve its robustness of performance against control noise during the iterative adjustments.

19 Claims, 5 Drawing Sheets

(56) References Cited

OTHER PUBLICATIONS

Banchi et al., "Quantum gate learning in qubit networks: Toffoli gate without time-dependent control," Quantum Information, 2016, 2(1): 1-6.
Office Action in Korean Appln. No. 10-2020-7020582, dated Dec. 15, 2022, 14 pages (with English Translation).
Babbush et al., "Low Depth Quantum Simulation of Electronic Structure," arXiv, Jan. 14, 2018, 41 pages.
Chakrabarti et al., "Quantum control landscapes," International Reviews in Physical Chemistry, Oct. 16, 2007, pp. 671-735.
Chen et al., "Fidelity-Based Probabilistic Q-Learning for Control of Quantum Systems," IEEE Transactions on Neural Networks and Learning Systems, Oct. 10, 2013, 25(5):920-933.
Chen et al., "Quantum Control and Quantum Information Technology," The Scientific World Journal, Aug. 7, 2013, 12 pages.
Dong et al., "Learning-based Quantum Robust Control: Algorithm, Applications and Experiments," arXiv, Jul. 12, 2020, 13 pages.
Dong et al., "Quantum control theory and applications: a survey," IET Control Theory & Applications, Dec. 2010, 4(12):2651-2671.
Gambetta et al., "Analytic control methods for high-fidelity unitary operations in a weakly nonlinear oscillator," Phys. Rev. A, Jan. 18, 2011, 13 pages.
Ho et al., "Landscape of unitary transformations in controlled quantum dynamics," Phys. Rev. A, Jan. 27, 2009, 16 pages.
Hocker et al., "Characterization of control noise effects in optimal quantum unitary dynamics," Phys. Rev. A, Dec. 2, 2014, 10 pages.
Jiang et al., "Quantum algorithms to simulate many-body physics of correlated fermions," arXiv, Apr. 30, 2018, 23 pages.
Kelly et al., "Optimal Quantum Control Using Randomized Benchmarking," Phys. Rev. Lett., Jun. 20, 2014, 5 pages.
Khaneja et al., "Optimal control of coupled spin dynamics: design of NMR pulse sequences by gradient ascent algorithms," Journal of Magnetic Resonance, Feb. 2005, 172(2):295-305.
Kivlichan et al., "Quantum Simulation of Electronic Structure with Linear Depth and Connectivity," arXiv, Feb. 3, 2018, 8 pages.
Moore et al., "On the relationship between quantum control landscape structure and optimization complexity," The Journal of Chemical Physics, Apr. 18, 2008, 13 pages.
Nagy et al., "Open-loop and closed-loop robust optimal control of batch processes using distributional and worst-case analysis," Journal of process control, Jun. 2004, 14(4):411-422.
Niu et al., "Universal Quantum Control through Deep Reinforcement Learning," arXiv, Apr. 16, 2018, 21 pages.
Palittapongarnpim et al., "Learning in quantum control: High-dimensional global optimization for noisy quantum dynamics," Neurocomputing, Dec. 13, 2017, 268:116-126.
Riviello et al., "Searching for an optimal control in the presence of saddles on the quantum-mechanical observable landscape, " Phys. Rev. A, Jun. 22, 2017, 15 pages.
Schulman et al., "High-Dimensional Continuous Control Using Generalized Advantage Estimation," arXiv, Oct. 20, 2018, 14 pages.
Schulman et al., "Proximal Policy Optimization Algorithms," arXiv, Aug. 28, 2017, 12 pages.
Schulman et al., "Trust Region Policy Optimization," Proceedings of the 32nd International Conference on Machine Learning, 2015, 37:1889-1897.
Sporl et al., "Optimal control of coupled Josephson qubits," Phys. Rev. A, Jan. 2, 2007, 9 pages.
Sutton et al., "Reinforcement Learning," Journal of Cognitive Neuroscience, 1999, 11(1):126-134.
Vatan et al., "Optimal quantum circuits for general two-qubit gates," Phys. Rev. A, Mar. 22, 2004, 5 pages.
Verstraete et al., "Quantum circuits for strongly correlated quantum systems," Phys. Rev. A, Mar. 16, 2009, 5 pages.
Wecker et al., "Progress towards practical quantum variational algorithms," Phys. Rev. A, Oct. 2, 2015, 10 pages.
Zahedinejad et al., "Designing High-Fidelity Single-Shot Three-Qubit Gates: A Machine-Learning Approach," Physical Review Applied, Nov. 16, 2016, 18 pages.
Zahedinejad et al., "High-Fidelity Single-Shot Toffoli Gate via Quantum Control," Physical review letters, May 20, 2015, 6 pages.
AU Office Action in Australian Application No. 2018406532, dated Nov. 24, 2020, 4 pages.
Bukov et al., "Reinforcement Learning in Different Phases of Quantum Control", dated Sep. 2017, 20 pages.
Ghosh et al., "Pulse Sequences for Suppressing Leakage in Single-Qubit Gate Operations", dated Dec. 2016, 8 pages.
PCT International Preliminary Report on Patentability in International Appln No. PCT/US2018/016238, dated Aug. 13, 2020, 12 pages.
PCT International Search Report and Written Opinion in International Appln No. PCT/US2018/016238, dated Oct. 29, 2018, 17 pages.
Yu et al., "Deep Q Network vs Policy Gradients—An Experiment on VizDoom with Keras", dated Oct. 2016, 13 pages.
CA Office Action in Chinese Application No. 3,088,135, dated Aug. 11, 2021, 5 pages.
IN Office Action in Indian Application No. 202047029322, dated Aug. 27, 2021, 6 pages (with English translation).
Office Action in Australian Appln. No. 2022204185, dated Mar. 16, 2023, 3 pages.
Extended European Search Report in European Appln. No. 23158575.3, dated Apr. 5, 2023, 14 pages.
Office Action in Japanese Appln. No. 2021-183504, dated Jun. 19, 2023, 7 pages (with English translation).
Office Action in Canada Appln. No. 3,088,135, dated Jul. 20, 2023, 3 pages.
Notice of Allowance in Japanese Appln. No. 2021-183504, dated Oct. 2, 2023, 5 pages (with English translation).
Office Action in Korean Appln. No. 10-2020-7020582, dated Aug. 28, 2023, 14 pages (with English translation).

QUANTUM COMPUTATION THROUGH REINFORCEMENT LEARNING

CROSS-REFERENCE TO RELATED APPLICATION

This application is a National Stage Application under 35 U.S.C. § 371 and claims the benefit of International Application No. PCT/US2018/016238, filed Jan. 31, 2018. The disclosure of the foregoing application is hereby incorporated by reference in its entirety.

BACKGROUND

This specification relates to quantum computing.

Large-scale quantum computers have the potential to provide fast solutions to certain classes of difficult problems. In gate model quantum computers, computational tasks are performed by implementing sequences of universal quantum gates, each of which specifies a trajectory of quantum computer's evolution. The faster quantum gate executes, the more computational capacity a given quantum device possesses.

SUMMARY

This specification describes methods and systems for designing quantum control trajectories using reinforcement learning.

In general, one innovative aspect of the subject matter described in this specification can be implemented in a method for designing a quantum control trajectory for implementing a quantum gate using quantum hardware, the method including the actions of representing the quantum gate as a sequence of control actions; applying a reinforcement learning model to iteratively adjust each control action in the sequence of control actions to determine a quantum control trajectory that implements the quantum gate and reduces leakage, infidelity and total runtime of the quantum gate during the iterative adjustments, comprising, for each iteration: determining, by an agent, a control action for the iteration based on a current state of a quantum system included in the quantum hardware; updating, by a training environment, the current state of the quantum system to a subsequent state of the quantum system using the determined control action and sample control noise; determining, by the agent, a discounted future reward using i) a universal control cost function that penalizes leakage, infidelity and total gate runtime as a reinforcement learning discounted future reward function and ii) the updated state of the quantum system; and adjusting, by the agent and based on the determined discounted future reward, values of one or more control trajectory parameters for the iteration.

Other implementations of this aspect include corresponding classical or quantum computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the agent comprises a first neural network and wherein determining a control action for the iteration based on a current state of a quantum system included in the quantum hardware comprises: providing, as input to the first neural network, a vector of parameter values representing the current state of the quantum system; and obtaining, as output from the first neural network, a vector of parameter values representing the control action.

In some implementations the parameter values representing the control action comprise values representing respective probability distributions for each component of the control action that, when sampled by the agent, defines the control action.

In some implementations adjusting by the agent and based on the determined discounted future reward, values of one or more control trajectory parameters comprises adjusting the first neural network, comprising adjusting the values of first neural network parameters based on the determined discounted future reward; determining an adjusted control action for the iteration using the adjusted first neural network; and adjusting the values of the control trajectory parameters for the iteration using the adjusted control action for the iteration.

In some implementations adjusting the values of the first neural network parameters comprises applying gradient descent methods with a learning rate determined by the determined discounted future reward.

In some implementations the agent comprises a second neural network configured to determine the discounted future reward.

In some implementations determining the discounted future reward using i) a universal control cost function that penalizes leakage, infidelity and total gate runtime as a reinforcement learning discounted future reward function and ii) the updated state of the quantum system comprises evaluating a sum of weighted universal control cost functions for future positions in the sequence of control actions based on the updated universal control cost function.

In some implementations applying the reinforcement model further comprises training the first neural network and the second neural network at each iteration by: sampling, from the agent and from different possible control trajectories i) a complete sequence of quantum states under different control trajectories, and ii) a complete sequence of universal control cost function values for different control trajectories; determining sampled discounted future rewards corresponding to the sampled quantum states and universal control cost function values; fitting the second neural network to the sampled discounted future rewards; and fitting the first neural network according to a gradient estimated from the sampling with a learning rate determined by the second neural network that encodes the discounted future reward.

In some implementations applying a reinforcement learning model to adjust each control action in the sequence of control actions to determine a quantum control trajectory that implements the quantum gate comprises performing a policy gradient method.

In some implementations each iteration is repeated multiple times until the adjusted values of the agent parameters converge to within a predefined limit.

In some implementations updating, by the training environment, the current state of the quantum system to a subsequent state of the quantum system using the determined control action and sample control noise comprises:

adjusting the vector of parameter values representing the control action based on randomly sampled quantum hardware noise; solving a time dependent Hamiltonian evolution that realizes the current control action using the adjusted vector of parameter values; and updating the state of the quantum system using the solved time dependent Hamiltonian evolution.

In some implementations adjusting the vector of parameter values representing the control action based on randomly sampled quantum hardware noise comprises: randomly sampling the control noise; and adding the randomly sampled noise to each entry of the vector of parameter values.

In some implementations randomly sampling the control noise comprises sampling amplitude fluctuations for different control amplitudes according to a zero mean Gaussian distribution with predetermined variance.

In some implementations the quantum hardware comprises one or more qubits, and wherein control noise comprises random quantum hardware noise resulting from one or more of i) qubit anharmonicity, ii) qubit detuning amplitude, iii) microwave control amplitudes and iv) two-qubit coupling pulse amplitude.

In some implementations solving a time dependent Hamiltonian evolution that realizes the current control action using the adjusted vector of parameter values comprises evaluating the Schrodinger equation using the adjusted vector of parameter values.

In some implementations the first neural network comprises multiple fully connected neural network layers.

In some implementations the second neural network comprises multiple fully connected neural network layers.

In some implementations the method further comprises implementing the quantum gate using the designed quantum control trajectory.

The subject matter described in this specification can be implemented in particular ways so as to realize one or more of the following advantages.

A system implementing quantum computation through reinforcement learning, as described in this specification, may improve the performance and computational efficiency of a quantum computing device or hybrid classical-quantum computing device. For example, a quantum computing device performing the techniques described herein may implement quantum gates with reduced errors and runtime, increased quantum gate fidelity, and improved robustness against unavoidable quantum hardware control noise that cause unknown fluctuations in the quantum dynamics of the computation process.

As another example, a balance between quantum gate runtime and fidelity may be determined. In addition, by implementing high fidelity quantum gates in a shortened gate runtime, near-term quantum computing devices may be used to solve hard problems outside of a classical computer's reach. Furthermore, the universality of the techniques described in this specification provides improved controllability of a quantum device.

A system implementing quantum computation through reinforcement learning, as described in this specification, may suppress all kinds of leakage errors across different frequency regimes during a generic time-dependent Hamiltonian evolution and is not restricted to suppressing leakage errors from a single source. Furthermore, all kinds of leakage errors are suppressed without requiring hard constraints on allowable forms of Hamiltonian modulation that impair the universality of the quantum control.

A system implementing quantum computation through reinforcement learning, as described in this specification, is not limited to settings where a complete knowledge of the physical model of the environment is available.

A system implementing quantum computation through reinforcement learning, as described in this specification, may implement arbitrary unitary single and multi-qubit gates.

For convenience, the techniques described in this specification are described as implementing a single quantum gate on one or more qubits. However, the applicability of the described system and techniques is fully scalable and may be extended to the implementation of sequences of quantum gates, where respective controls used to implement the sequence of gates can be merged into a single control, providing a speed up in computation time whilst increasing gate sequence fidelity. u The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
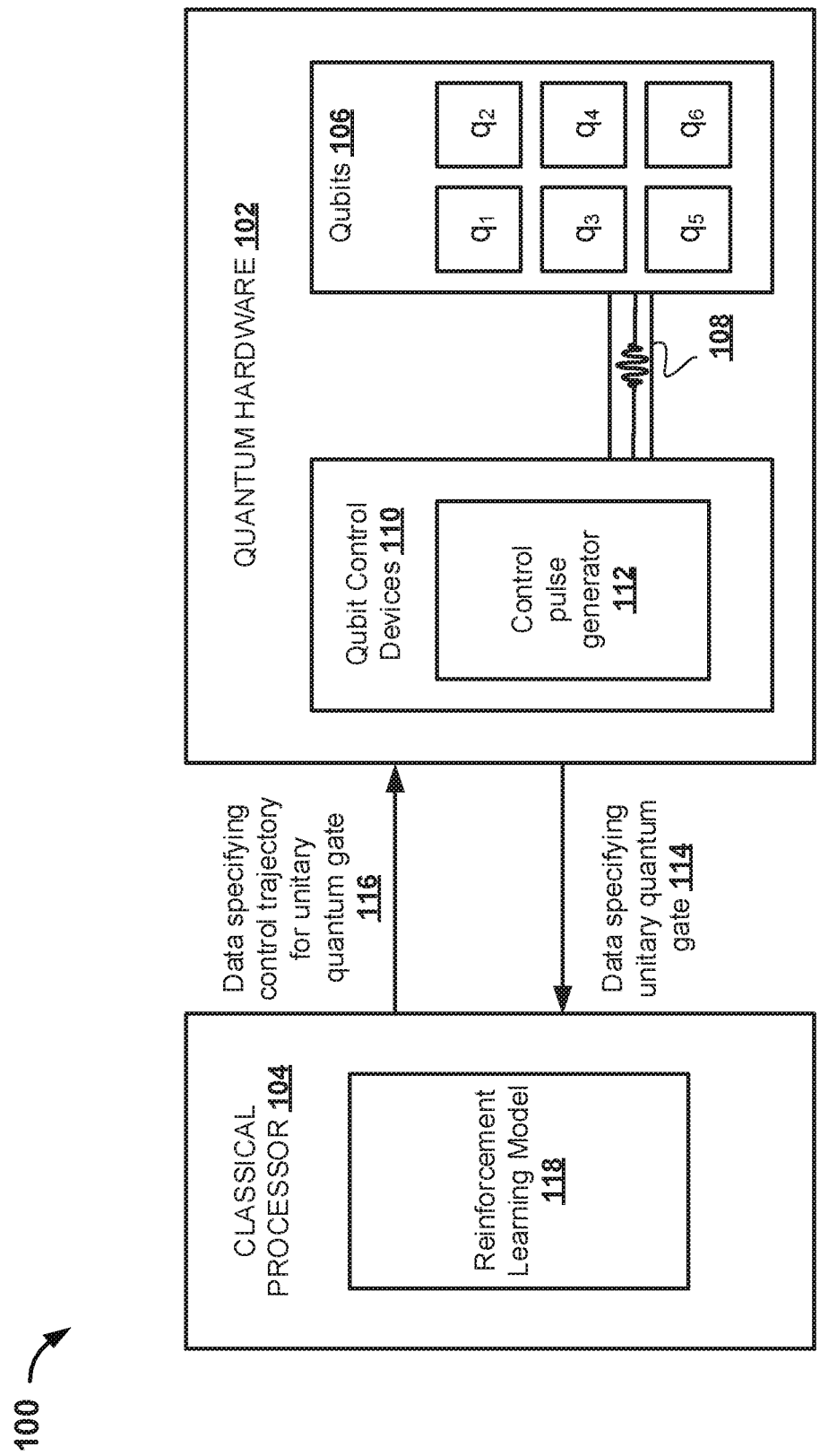
FIG. 1 depicts an example system for designing and implementing quantum control trajectories.

In gate model quantum computation, computational tasks are carried out by a sequence of universal quantum gates, each of which specifies a trajectory of the quantum computer's evolution. Generally, the faster a quantum gate or sequence of quantum gates executes, the more computational capacity the quantum computer possesses.

A major obstacle for realizing fast, high-fidelity quantum gates is leakage errors. Leakage errors may be defined as leakage of quantum information encoded in the state of a qubit from a predefined computational subspace into a non-computational subspace. There are two distinct sources of leakage errors: coherent leakage error and incoherent leakage error. Coherent leakage error results from the direct coupling between a qubit's computational subspace and non-computational subspace. Incoherent leakage error results from modulation of the system Hamiltonian in a time-interval shorter than allowed by the condition for adiabaticity. Existing approaches for designing control trajectories for realizing fast, high-fidelity quantum gates typically do not consider both sources of leakage but consider different types of leakage separately.

Another major obstacle for realizing fast, high-fidelity quantum gates is unavoidable quantum hardware control noise that cause unknown fluctuations in the quantum dynamics of the computation process. Quantum hardware control noise may be defined as noise resulting from one or more of qubit anharmonicity, qubit detuning amplitude, microwave control amplitudes and or qubit coupling pulse amplitude. Existing approaches for designing control sequences for realizing fast, high-fidelity quantum gates typically do not consider such random control noise and therefore cannot be directly applied to realistic experimental settings. Instead, efforts towards improving the robustness of quantum control sequences against random noise focus on closed-loop feedback control optimization. These approaches require frequent measurement of the quantum system, which can be expensive to realize in existing quantum computing architectures. Alternatively, existing open-loop optimization methods address the robustness of control by the analysis of control curvature which require the calculation of control Hessian and are intractable for solving multi-qubit control problems.

This specification describes methods and systems for applying reinforcement learning techniques to design quantum gate control schemes for near-term quantum computers. To minimize leakage errors, a reinforcement learning model applies a universal quantum control cost function that penalizes complete leakage errors, infidelity, and realistic control constraints as a reward function. To provide robustness of overall fidelity against noise, the reinforcement learning model includes a stochastic training environment that integrates random noise in the control amplitudes. The methods and systems may be universally applied to arbitrary quantum gates and multi-qubit systems.

Example Operating Environment

FIG. 1 depicts an example system 100 for designing and implementing quantum control trajectories. The example system 100 is an example of a system implemented as classical or quantum computer programs on one or more classical computers or quantum computing devices in one or more locations, in which the systems, components, and techniques described below can be implemented.

The system 100 includes quantum hardware 102 in data communication with a classical processor 104. The system 100 is configured to perform classical computations in combination with quantum computations using the classical processors 104 and the quantum hardware 102.

The quantum hardware 102 includes one or more qubits 106. The qubits 106 may include qubits that can be efficiently prepared in an initial state and operated on via application of quantum gates. The type of physical realizations of qubits included in the quantum hardware 102 may vary. For example, in some implementations the quantum hardware 102 may include superconducting qubits, e.g., superconducting charge qubits, superconducting flux qubits or superconducting phase qubits. In other implementations the quantum hardware 102 may include qubits realized by spins, e.g., electron spins, nuclear spins or atomic spins. Generally, the qubits 106 may be frequency tunable.

The quantum hardware 102 may include a set of qubit frequency control lines, e.g., where each qubit frequency control line corresponds to an individual qubit. The qubit frequency control lines control the frequency of the qubits 106, e.g., where each qubit frequency control line controls the frequency of its corresponding qubit.

The quantum hardware 102 may include one or more excitation drivelines. For convenience one driveline, e.g., driveline 108, is shown in FIG. 1, however in some implementations the quantum hardware may include multiple drivelines, e.g., one driveline corresponding to each of the qubits 106. The one or more excitation drivelines provide excitation control of the qubits 106. The one or more excitation drivelines may be configured to run excitation pulses (also referred to herein as control pulses), e.g., control pulse 108, with different quantum gates at different frequencies. Each qubit may be tuned towards or away from these frequencies on the one or more excitation drivelines.

The quantum hardware 102 may include a set of couplers. Each coupler in the set of couplers couples a corresponding qubit to an excitation driveline. The couplers may be any type of coupler, e.g., capacitive couplers. In order to achieve a capacitive coupling, a microwave line may be run adjacent to a qubit capacitor.

The quantum hardware 102 includes qubit control devices 110. The control devices 110 include devices configured to operate on the one or more qubits 106. For example, the control devices 110 may include hardware for implementing quantum logic gates, e.g., control pulse generator 112 that generates excitation pulses to be run on the one or more excitation drivelines. In some implementations the control pulse generator 112 may be a microwave control device. In addition, the control devices 112 may include hardware for performing measurements on the one or more qubits 106, e.g., oscillators.

The classical processor 104 is configured to perform quantum control optimization procedures. In particular, the classical processor 104 is configured to design control trajectories of a sequence of control pulses for implementing respective quantum gates. For example, the classical processor 104 may receive data specifying a particular unitary quantum gate or sequence of multiple unitary quantum gates, e.g., input data 114. The classical processor 104 may then design control trajectories that may be generated by the qubit control devices 110, e.g., control pulse generator 112, and applied to one or more of the qubits 106.

The control trajectories designed by the classical processor 104 may be used to implement arbitrary unitary quantum gates with reduced leakage errors, gate infidelity and total gate runtime, whilst being robust to hardware control noise.

To design such a control trajectory, the classical processor 104 represents a quantum gate as a sequence of control actions. The classical processor 104 includes a reinforcement learning model 118 that iteratively adjusts each control action in the sequence of control actions to determine a quantum control trajectory that implements the quantum gate and reduces leakage, infidelity and total runtime of the quantum gate during the iterative adjustments. Data representing quantum control trajectories determined by the reinforcement learning model 118, e.g., output data 116, can be transmitted from the classical processor 104 to the quantum hardware 102. An example reinforcement learning model is described in detail below with reference to FIGS. 2A and 2B. An example process for designing a quantum control trajectory for implementing a quantum gate using quantum hardware is described in detail below with reference to FIGS. 3 to 5.

Figures 2A, 2B:
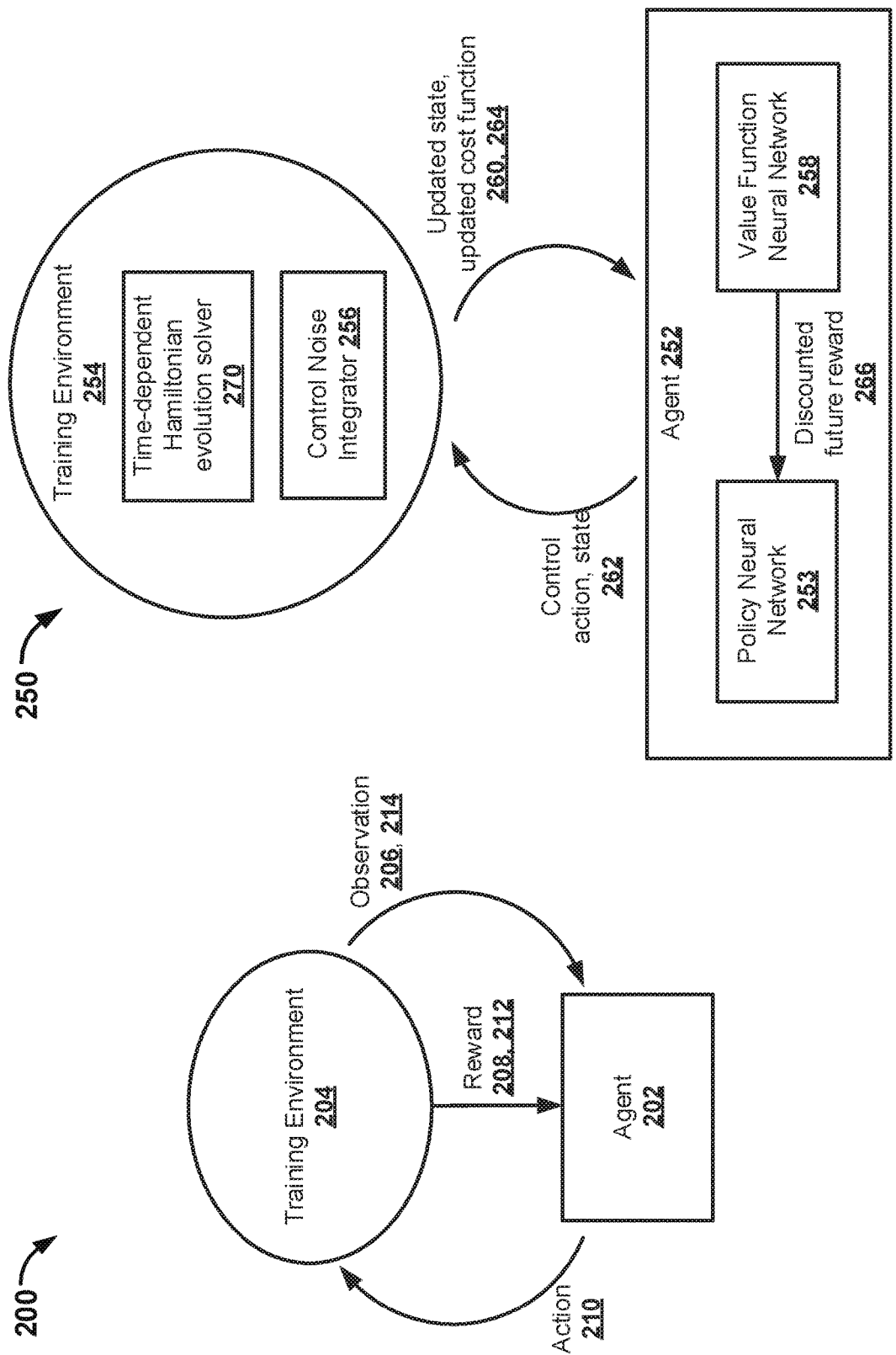
FIG. 2A is an illustration of a conventional reinforcement learning model.
FIG. 2B is an illustration of a reinforcement learning model for designing quantum gate control schemes.

FIG. 2A is an illustration of an example conventional reinforcement learning model 200. The example conventional reinforcement learning model 200 includes an agent 202 and a training environment 204 that interacts with the agent 202. The training environment is a fully observable environment. At each step in a sequence of steps, the agent 202 receives an observation 206 and a reward 208 from the training environment 204. The agent 202 then chooses an appropriate action 210 from a set of available actions to take based on the received observation 206 and reward 208.

The agent 202 provides the training environment 204 with the chosen action 210. The training environment 204 updates its state and determines a reward 212 associated with the state update. The training environment gives the determined reward 212 to the agent 202 together with a subsequent observation 214 for a next step in the sequence of steps using the action 208.

The example conventional reinforcement learning model 200 performs reinforcement learning techniques to teach the agent 202 to take actions, e.g., action 210, with the goal to maximize an overall reward at the end of the sequence of steps—the agent 202 may not receive a reward or receive a maximum reward at each step. To act near optimally, the agent 202 must reason about the long term consequences of its actions, even if the immediate reward of this might be negative. The agent 202 learns to take appropriate actions based on the rewards it receives—there is no supervisor present.

FIG. 2B is an illustration of an example reinforcement learning model 250 for designing quantum gate control schemes. The example reinforcement learning model 250 includes an agent 252 in data communication with a training environment 254. The agent 252 includes a policy neural network 253 and a value function neural network 258. The training environment 254 includes a control noise integrator 256 and a time-dependent Hamiltonian evolution solver 270. For each control action in a sequence of control actions, the sequence of control actions representing a corresponding quantum gate, the agent 252 receives data representing a quantum state. The data may include data representing values of state variables that define the state. The agent 252 processes the received data using the policy neural network 253 and the value function neural network 258.

The policy neural network 253 is a deep neural network, e.g., with one or more fully connected layers. The policy neural network 253 is configured to process received inputs representing quantum states and to generate respective outputs representing control actions of a Hamiltonian control. That is, the policy neural network 253 encodes the quantum control trajectory and captures regularities of optimal control action under random control noise that conventional control optimization techniques are unable to detect. Such regularities often facilitate more efficient optimization and also enable transfer learning from an old target to a new target.

The agent 252 provides the training environment 254 with data representing the generated control action 262 and the received data representing the quantum state 260. The training environment 254 provides the data representing the generated control action 262 to the control noise integrator 256. The control noise integrator 256 randomly samples noise and provides the randomly sampled noise to the time-dependent Hamiltonian evolution solver that generates data representing an updated quantum state 268. The training environment 254 uses the data representing the updated quantum state 268 to update a universal quantum control cost function. Data representing the updated quantum state 260 and the updated control cost function 264 is provided to the agent 252 to update both the value function neural network 258 and the policy neural network 253.

The value function neural network 258 is configured to process received inputs to generate respective outputs representing discounted future rewards, e.g., discounted future reward 266. That is, the value function neural network 258 encodes projected future interactions with a stochastic environment to avoid overfitting the policy neural network 253 and to facilitate sampling over future trajectories to perform optimization over the policy neural network 253.

Programming the Hardware

Figure 3:
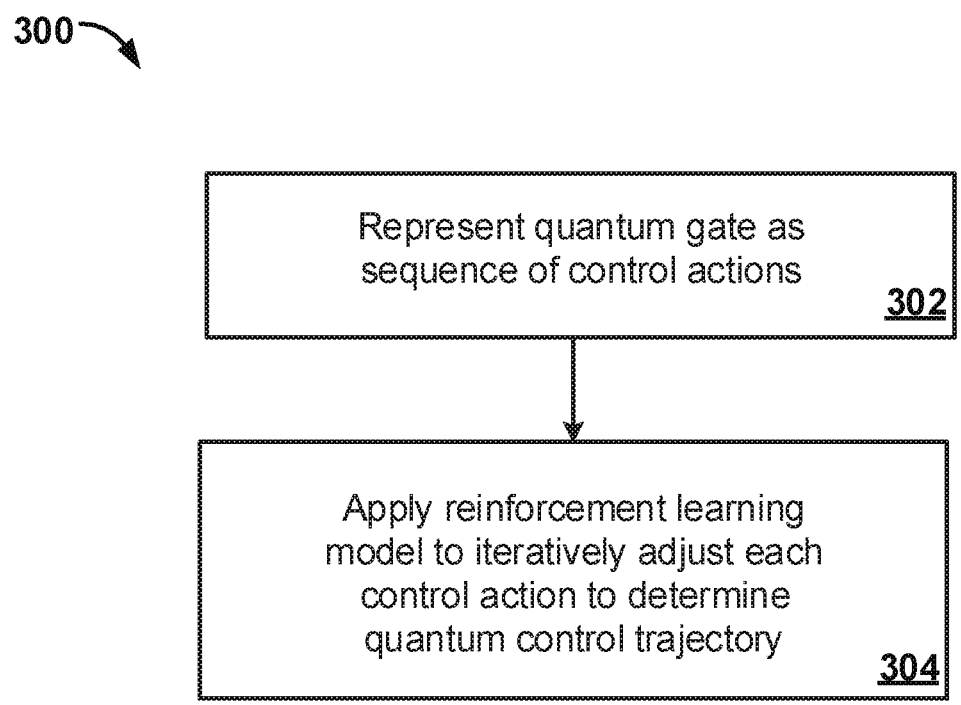
FIG. 3 is a flow diagram of an example process for designing a quantum control trajectory for implementing a quantum gate using quantum hardware.

FIG. 3 is a flow diagram of an example process 300 for designing a quantum control trajectory for implementing a quantum gate using quantum hardware. For convenience, the process 300 will be described as being performed by a system of one or more classical or quantum computing devices located in one or more locations. For example, the system 100 of FIG. 1 appropriately programmed in accordance with this specification can perform the process 300.

The system represents the quantum gate as a sequence of control actions (step 302). The quantum gate may be a single qubit gate that operates on one qubit or a multi-qubit gate that operates on multiple qubits. Representing the quantum gate as a sequence of control actions includes representing the quantum gate as a sequence of unitary transformations where each element in the sequence of unitary transformations is determined by a respective control action. Example control actions include microwave control pulses that may be applied to the quantum hardware to implement the corresponding unitary transformations.

The system applies a reinforcement learning model to iteratively adjust the control actions in the sequence of control actions to determine a quantum control trajectory that implements the quantum gate and reduces leakage, infidelity and total runtime of the quantum gate during the iterative adjustments (step 304). Applying the reinforcement learning model may include applying policy gradient methods. An example reinforcement learning model is described above with reference to FIG. 2B. An example iteration of applying a reinforcement learning model for determining a quantum control trajectory is described in detail below with reference to FIGS. 4 and 5.

The system implements the quantum gate using the designed quantum control trajectory.

Figure 4:
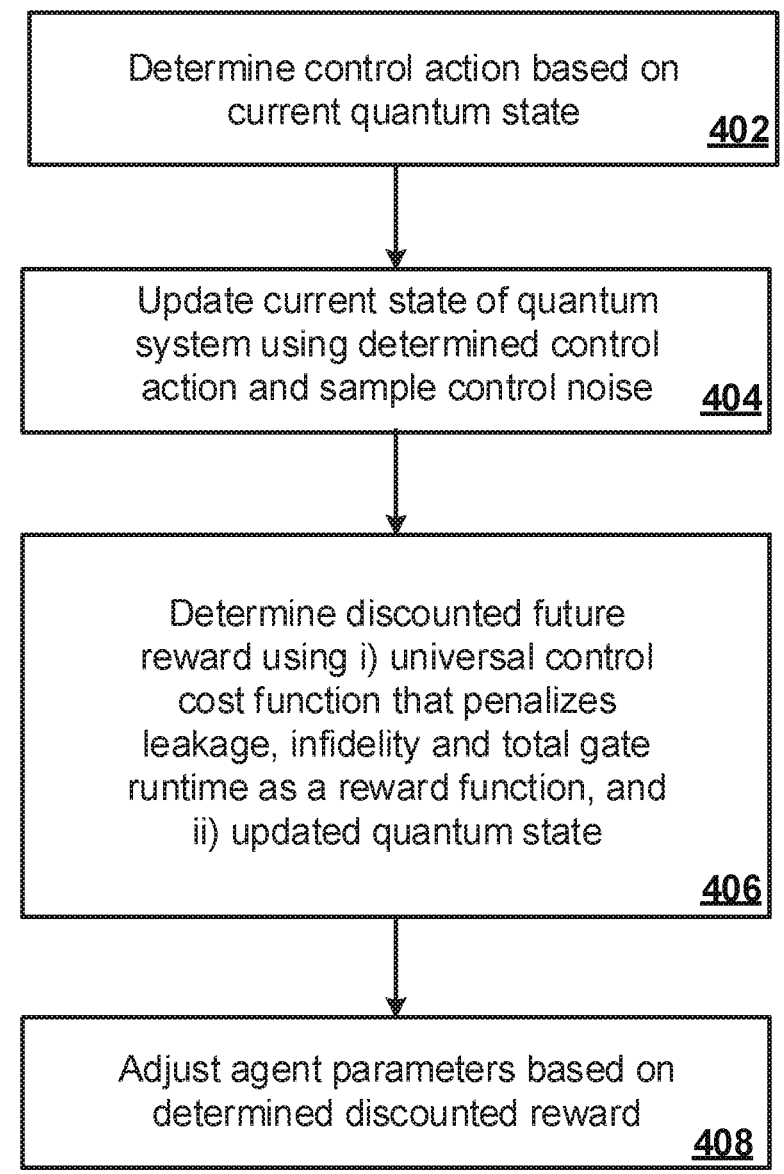
FIG. 4 is a flow diagram of an example iteration of applying a reinforcement learning model for determining a quantum control trajectory.

FIG. 4 is a flow diagram of an example iteration 400 of applying a reinforcement learning model for determining a quantum control trajectory. For convenience, the process 400 will be described as being performed by a system of one or more classical or quantum computing devices located in one or more locations. For example, the system 100 of FIG. 1 appropriately programmed in accordance with this specification can perform the process 400.

The system determines, by a reinforcement learning agent, a control action for the iteration based on a current state of a quantum system included in the quantum hardware (step 402). As described above with reference to FIGS. 1 and 2, in some implementations the agent may include a policy neural network (first neural network) that is configured to process inputs representing quantum states to generate outputs representing control actions that can be used to update the quantum state, as described below with reference to step 404. In these implementations the system may determine a control action for the iteration by providing, as input to the first neural network, a vector of parameter values representing the current state of the quantum system, e.g., state variables, and obtaining, as output from the first neural network, a vector of parameter values representing the control action.

In some implementations the outputs generated by the first neural network may include a vector of values representing probability distributions for each component of the control action that, when sampled by the agent, defines the control action. Example components of a control action include system Hamiltonian anharmonicity, mode coupling strengths, detuning, or microwave pulse strengths.

The system updates, by a training environment, the current state of the quantum system to a subsequent state of the quantum system using the determined control action and sample control noise (step 404). Updating the current state of the quantum system is described in detail below with reference to FIG. 5.

The system uses the updated state of the quantum system to update a universal quantum control cost function used by the training environment as a reinforcement learning discounted future reward function. The universal control cost function contains penalty terms on the forms of the unitary transformation determined by the control action for the iteration and is dependent on the state of the quantum system. Such penalty terms provide the system with increased controllability of the quantum system and the implementation of the quantum gate.

To suppress the total leakage errors that cause quantum information to be lost to the environment, the universal quantum control cost function includes a qubit leakage penalty term $L_{TSWTLB}$ that represents both coherent qubit leakage and incoherent qubit leakage during time dependent Hamiltonian evolution.

To conveniently prepare and measure qubits in the computational basis at the beginning and the end of each Hamiltonian evolution, it is required that the term representing time-dependent Hamiltonian coupling within the qubit computational subspace and the term representing control pulse coupling of the qubit computational subspace with the higher energy subspace vanish at both boundaries. Such a control constraint may be enforced by adding a boundary control constraint penalty term to the total cost function. For example, in the case of the gmon Hamiltonian, the system may define the universal quantum control cost function as including the boundary control constraint penalty term $[\delta(t)^2|_{t=0,T} + f(t)^2|_{t=0,T}]$.

To reduce the total unitary quantum gate runtime T—a desirable property for near-term quantum devices—the universal quantum control cost function may further include a total runtime penalty term.

To reduce infidelity of a unitary transformation U(T)—the difference between the fidelity of the actual unitary transformation from its maximum value 1–the universal quantum control cost function may further include a fidelity penalty term 1−F(U(T)).

An example universal quantum cost function for a gmon Hamiltonian is given below in Equation (1).

$$C(\alpha,\beta,\gamma,\kappa) = \alpha[1-F(U(T))] + \beta L_{TSMTLB} + \gamma[(\delta(t)^2|_{t=0,T} + f(t)^2|_{t=0,T}] + \kappa T \quad (1)$$

In Equation (1), 1−F(U(T)) represents the infidelity penalty term with the fidelity given by $$(U(T)) = \frac{1}{2^2}|Tr(U^\dagger(T)U_{target}|^2,$$

where (U(T)) represents the unitary transformation and $U_{target}$ represents the intended action of the unitary transformation, e.g., in the absence of leakage errors or control noise.

In Equation (1), $L_{TSMTLB}$ represents the qubit leakage penalty term and is given by $$L_{TSWTLB} = \int_0^1 \frac{1}{\Delta^2(s)} \frac{1}{T} \left\| \frac{d^2 \mathbb{H}_{od}(s)}{ds^2} \right\| ds + \frac{\|\mathbb{H}_{od}(0)\|}{\Delta(0)} + \frac{\|\mathbb{H}_{od}(T)\|}{\Delta(T)}$$

where T represents total gate run time, Δ represents the energy gap between the two lowest energy eigenstates, and $\mathbb{H}_{od}(s)$ resents a block-off-diagonal component of an effective Hamiltonian for the quantum system with direct coupling leakage errors suppressed to a given order.

The leakage penalty term is formulated through the development of a generalized time-dependent Schrieffer-Wolff transformation (TSWT). The leakage bound takes advantage of beneficial virtual transitions between the computational subspace and the unwanted higher energy subspaces while providing an upper bound on both direct coupling (coherent) and non-adiabatic (incoherent) leakage errors caused by both the on-resonant and off-resonant couplings throughout time-dependent Hamiltonian evolution.

To derive the leakage bound, a general time-dependent Schrieffer-Wolff transformation (TSWT) is formulated and its solution given up to any given order, e.g., second order. The generalized TSWT provides a rotated basis supported in a higher dimensional subspace where direct coupling leakage errors are suppressed to the given order. This rotated basis coincides with the qubit basis at the beginning and the end of quantum control procedure to enable convenient state initialization and readout. A first leakage bound corresponding to direct coupling leakage is formulated using the generalized TSWT.

A second leakage bound is formulated through a generalization of the adiabatic theorem from pure states to energy subspaces. This allows for time-dependent Hamiltonian evolution to occur both within and between different subspaces. A generalized adiabatic theorem provides an upper bound on the non-adiabatic (incoherent) leakage errors in the TSWT basis during a generic time-dependent Hamiltonian evolution.

Since the direct coupling leakage error is dominated by the off-resonant frequency component, while the non-adiabatic leakage errors are dominated by the on-resonant frequency components, the first and second leakage bounds may be combined in the universal cost function leakage penalty term to provide an upper bound for all sources of leakage errors induced by both off-resonant and on-resonant leakage contributions.

In Equation (1), $[\delta(t)^2|_{t=0,T} + f(t)^2|_{t=0,T}]$ represents the control constraint penalty term, with δ representing detuning and f representing microwave pulse strength.

In Equation (1), T represents total gate runtime and a penalizes the gate infidelity, β penalizes all sources of leakage error from the leakage bound $L_{TSMTLB}$, γ penalizes the violation of zero-value boundary constraint and κ penalizes gate time.

The system determines, by the reinforcement learning agent, a discounted future reward using i) the updated state of the quantum system as described with reference to step 404, and ii) the updated universal control cost function and (step 406). Determining the discounted future reward includes evaluating a sum of weighted universal control cost functions for future positions in the sequence of control actions based on the updated universal control cost function. For example, for an n-th iteration of a sequence of N iterations, the system determines the discounted future reward by evaluating a sum of weighted universal control cost functions for positions n+1, n+2, . . . , N of the sequence of control actions. The discounted future reward provides a projected total control cost for the control action determined by the reinforcement learning agent, i.e., a measure indicating the fidelity of the partial sequence of unitary transformations up to the current step n and its future projection.

The system adjusts, by the agent and based on the determined discounted future reward, values of one or more control trajectory parameters for the iteration (step 408). In cases where the agent includes a policy neural network, adjusting the values of one or more control trajectory parameters for the iteration comprises adjusting the policy neural network by adjusting parameters of the policy neural network based on the determined discounted future reward. This may include applying policy gradient methods. For example, this may include applying gradient descent methods with a learning rate defined by the determined discounted future reward. An adjusted control action for the iteration can then be determined by the adjusted policy neural network. The system then adjusts control trajectory parameters based on the adjusted control action for the iteration.

The system may also adjust the value function neural network (second neural network) at each iteration, i.e., applying the reinforcement model may include training both the policy neural network and the value function neural network at each iteration. This can be achieved by sampling, from the agent and from different possible control trajectories i) a complete sequence of quantum states under different control trajectories, and ii) a complete sequence of universal control cost function values for different control trajectories. The system may then determine sampled discounted future rewards corresponding to the sampled quantum states and universal control cost function values. The system may then fit the second neural network to the sampled discounted future rewards and fit the first neural network according to a gradient estimated from the sampling with a learning rate determined by the second neural network that encodes the discounted future reward By training the reinforcement learning agent using the determined discounted future reward, the agent can be rewarded for outputting control actions that result in a quantum control trajectory that can be used to implement the quantum gate with reduced leakage, infidelity and total runtime, i.e., an optimal quantum control trajectory. By repeating the process 400 multiple times, the reinforcement learning agent may improve the control actions it outputs, i.e., generate control actions that increase discounted future rewards.

In some implementations the process 400 may be repeated until the adjusted values of the agent parameters converge to within a predefined limit. That is, each iteration may be repeated in order to adjust the reinforcement agent parameters from initial values, e.g., randomly initialized values, to trained values. Determining whether the agent parameters converge to within a predefined limit may be performed by the training environment based on a satisfaction condition associated with the design of the quantum trajectory, e.g., when the fidelity of the gate reaches a threshold value and the boundary constraints described above with reference to the universal control cost function are within a pre-defined accuracy.

Figure 5:
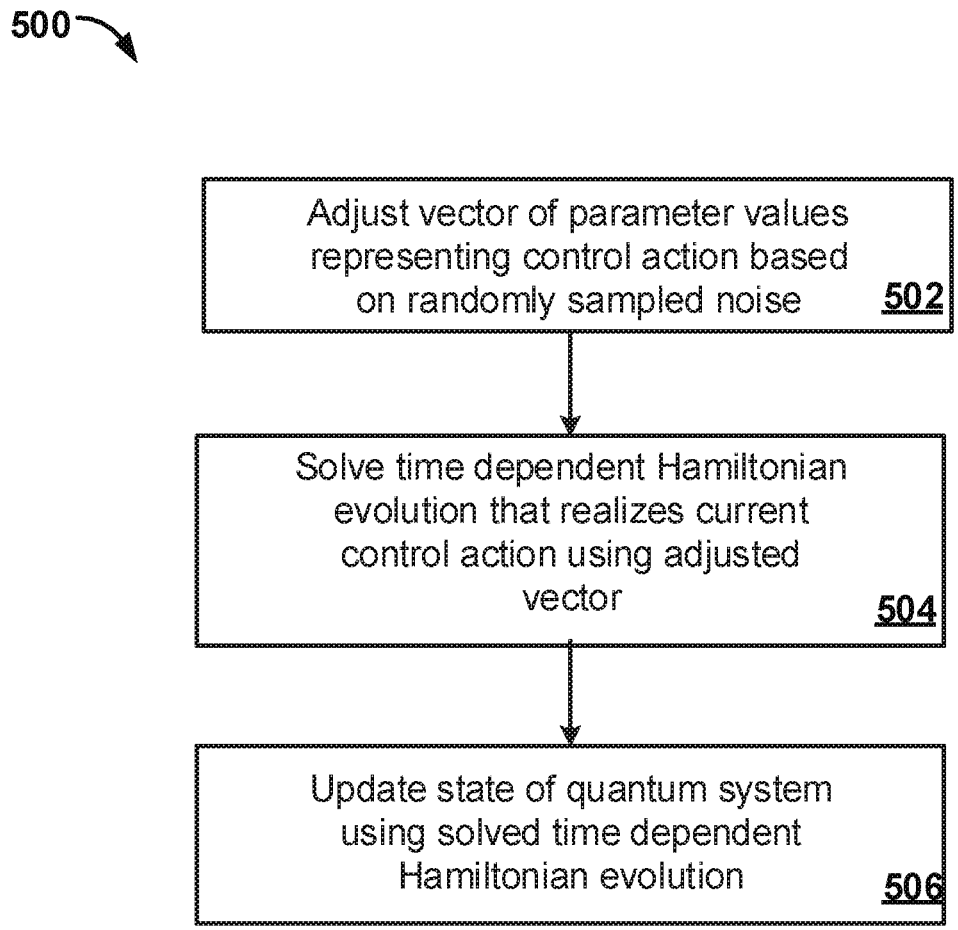
FIG. 5 is a flow diagram of an example process for updating a current state of a quantum system using a determined control action and sample control noise.

FIG. 5 is a flow diagram of an example process 500 for updating a current state of a quantum system using a determined control action and sample control noise. For convenience, the process 500 will be described as being performed by a system of one or more classical or quantum computing devices located in one or more locations. For example, the system 100 of FIG. 1 appropriately programmed in accordance with this specification can perform the process 500.

The system adjusts the vector of parameter values representing the control action $\hat{H}_{n+1}$ based on randomly sampled quantum hardware noise $\delta$ (step 502). For example, the system may randomly sample the control noise by sampling amplitude fluctuations for different control amplitudes according to a zero mean Gaussian distribution with predetermined variance. The system may then add the randomly sampled control noise to each entry of the vector of parameter values.

For example, for a quantum system that includes two interacting gmon circuits, as given by the below Hamiltonian in the rotating wave approximation, $$\hat{H}_{RWA} = \frac{\eta}{2} \sum_{j=1}^{2} \hat{n}_j(\hat{n}_j - 1) + g(t)(\hat{a}_2^\dagger \hat{a}_1 + \hat{a}_1^\dagger \hat{a}_2) +$$

$$\sum_{j=1}^{2} \delta_j(t) \hat{n}_j + \sum_{j=1}^{2} if_j(t)(\hat{a}_j e^{i\phi_j} - \hat{a}_j^\dagger e^{-i\phi_j})$$

the system may adjust the vector of parameter values representing the control action by adding amplitude fluctuations sampled from a zero mean Gaussian distribution of a range of variances from 0.1-3.5 Mhz to the control amplitudes $\eta \rightarrow \delta\eta$, $g(t_k) \rightarrow g(t_k) + \delta g(t_k)$, $\delta_j(t_k) \rightarrow \delta_j(t_k) + \delta\delta_j(t_k)$, $f_j(t_k) \rightarrow f_j(t_k) + \delta f_j(t_k)$ for some discretized time step $t_k$, where $\eta_j$ represents anharmonicity, g represents two-mode coupling, $\delta_j$ represents detuning, and $f_j$ represents microwave pulse strength.

The system solves a time dependent Hamiltonian evolution that realizes the current control action using the adjusted vector of parameter values (step 504). This may include evaluating the Schrodinger equation using the adjusted vector of parameter values, e.g., evaluating $\exp[i(\hat{H}_{n+1} + \delta\hat{H}_{n+1})t]U_n$ where $U_n$ represents the current state of the quantum system.

The system updates the state of the quantum system using the solved time dependent Hamiltonian evolution (step 506). That is, the system sets $U_{n+1} = \exp[i(\hat{H}_{n+1} + \delta\hat{H}_{n+1})]U_n$. The updated quantum state $U_{n+1}$ may then be provided to the value function neural network (second neural network) included in the agent for processing, as described above with reference to FIG. 4.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer implemented method for designing a quantum control trajectory for implementing a quantum gate using quantum hardware, the method comprising:
   representing, by a classical processor, the quantum gate as a sequence of control actions;
   applying, by a classical processor, a reinforcement learning model to iteratively adjust each control action in the sequence of control actions to determine a quantum control trajectory that implements the quantum gate and reduces leakage, infidelity and total runtime of the quantum gate during the iterative adjustments, comprising, for each iteration:
      determining, by an agent, a control action for the iteration based on a current state of a quantum system included in the quantum hardware;
      updating, by a training environment, the current state of the quantum system to a subsequent state of the quantum system using the determined control action and sample control noise;
      determining, by the agent, a discounted future reward using i) a universal control cost function that penalizes leakage, infidelity and total gate runtime as a reinforcement learning discounted future reward function and ii) the updated state of the quantum system; and
      adjusting, by the agent and based on the determined discounted future reward, values of one or more control trajectory parameters for the iteration; and
   implementing, by the quantum hardware, the quantum gate using the quantum control trajectory.

2. The method of claim 1, wherein the agent comprises a first neural network and wherein determining a control action for the iteration based on a current state of a quantum system included in the quantum hardware comprises:
   providing, as input to the first neural network, a vector of parameter values representing the current state of the quantum system; and
   obtaining, as output from the first neural network, a vector of parameter values representing the control action.

3. The method of claim 2, wherein the parameter values representing the control action comprise values representing respective probability distributions for each component of the control action that, when sampled by the agent, defines the control action.

4. The method of claim 2, wherein adjusting by the agent and based on the determined discounted future reward, values of one or more control trajectory parameters comprises
   adjusting the first neural network, comprising adjusting the values of first neural network parameters based on the determined discounted future reward;
   determining an adjusted control action for the iteration using the adjusted first neural network; and
   adjusting the values of the control trajectory parameters for the iteration using the adjusted control action for the iteration.

5. The method of claim 4, wherein adjusting the values of the first neural network parameters comprises applying gradient descent methods with a learning rate determined by the determined discounted future reward.

6. The method of claim 2, wherein the first neural network comprises multiple fully connected neural network layers.

7. The method of claim 1, wherein the agent comprises a second neural network configured to determine the discounted future reward.

8. The method of claim 7, wherein applying the reinforcement model further comprises training the first neural network and the second neural network at each iteration by:
   sampling, from the agent and from different possible control trajectories i) a complete sequence of quantum states under different control trajectories, and ii) a complete sequence of universal control cost function values for different control trajectories;

determining sampled discounted future rewards corresponding to the sampled quantum states and universal control cost function values;
fitting the second neural network to the sampled discounted future rewards; and
fitting the first neural network according to a gradient estimated from the sampling with a learning rate determined by the second neural network that encodes the discounted future reward.

9. The method of claim 7, wherein the second neural network comprises multiple fully connected neural network layers.

10. The method of claim 1, wherein determining the discounted future reward using i) a universal control cost function that penalizes leakage, infidelity and total gate runtime as a reinforcement learning discounted future reward function and ii) the updated state of the quantum system comprises evaluating a sum of weighted universal control cost functions for future positions in the sequence of control actions based on the updated universal control cost function.

11. The method of claim 1, wherein applying a reinforcement learning model to adjust each control action in the sequence of control actions to determine a quantum control trajectory that implements the quantum gate comprises performing a policy gradient method.

12. The method of claim 1, wherein each iteration is repeated multiple times until the adjusted values of the agent parameters converge to within a predefined limit.

13. The method of claim 12, wherein adjusting the vector of parameter values representing the control action based on randomly sampled quantum hardware noise comprises:
randomly sampling the control noise; and
adding the randomly sampled noise to each entry of the vector of parameter values.

14. The method of claim 12, wherein solving a time dependent Hamiltonian evolution that realizes the current control action using the adjusted vector of parameter values comprises evaluating the Schrodinger equation using the adjusted vector of parameter values.

15. The method of claim 1, wherein updating, by the training environment, the current state of the quantum system to a subsequent state of the quantum system using the determined control action and sample control noise comprises:
adjusting the vector of parameter values representing the control action based on randomly sampled quantum hardware noise;
solving a time dependent Hamiltonian evolution that realizes the current control action using the adjusted vector of parameter values; and
updating the state of the quantum system using the solved time dependent Hamiltonian evolution.

16. The method of claim 15, wherein randomly sampling the control noise comprises sampling amplitude fluctuations for different control amplitudes according to a zero mean Gaussian distribution with predetermined variance.

17. The method of claim 1, wherein the quantum hardware comprises one or more qubits, and wherein control noise comprises random quantum hardware noise resulting from one or more of i) qubit anharmonicity, ii) qubit detuning amplitude, iii) microwave control amplitudes and iv) two-qubit coupling pulse amplitude.

18. The method of claim 1, further comprising implementing the quantum gate using the designed quantum control trajectory.

19. A system comprising:
one or more computers and one or more storage devices storing instructions that are operable, when executed by the one or more computers, to cause the one or more computers to perform operations for designing a quantum control trajectory for implementing a quantum gate using quantum hardware, the operations comprising:
representing the quantum gate as a sequence of control actions;
applying a reinforcement learning model to iteratively adjust each control action in the sequence of control actions to determine a quantum control trajectory that implements the quantum gate and reduces leakage, infidelity and total runtime of the quantum gate during the iterative adjustments, comprising, for each iteration:
determining, by an agent, a control action for the iteration based on a current state of a quantum system included in the quantum hardware;
updating, by a training environment, the current state of the quantum system to a subsequent state of the quantum system using the determined control action and sample control noise;
determining, by the agent, a discounted future reward using i) a universal control cost function that penalizes leakage, infidelity and total gate runtime as a reinforcement learning discounted future reward function and ii) the updated state of the quantum system; and
adjusting, by the agent and based on the determined discounted future reward, values of one or more control trajectory parameters for the iteration; and
quantum computing hardware configured to perform operations comprising implementing the quantum gate using the quantum control trajectory.

* * * * *